Nov. 10, 1953  A. G. EMSLIE  2,659,009
ELECTRONIC OSCILLATOR SYNCHRONIZING CIRCUIT
Filed May 17, 1945
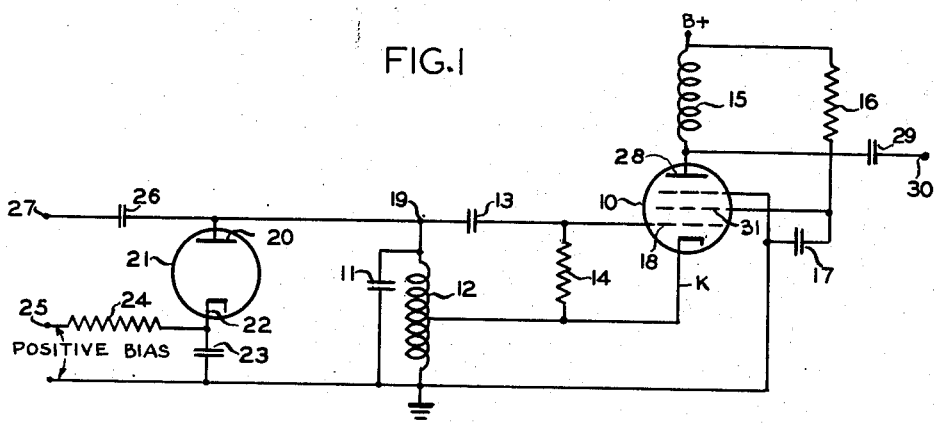
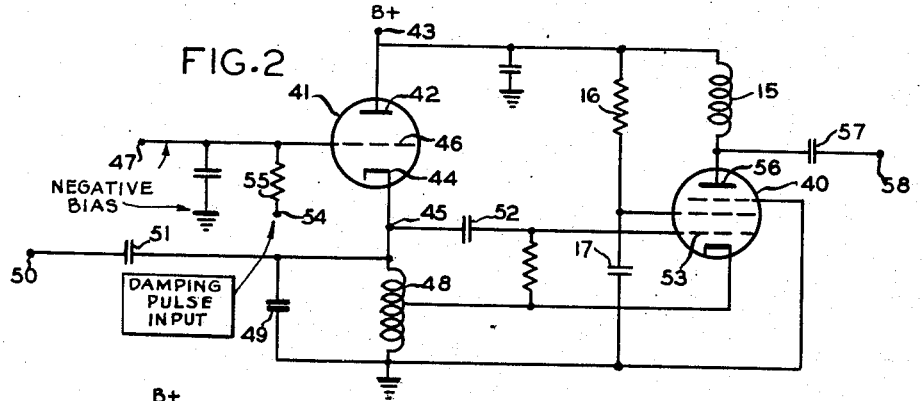
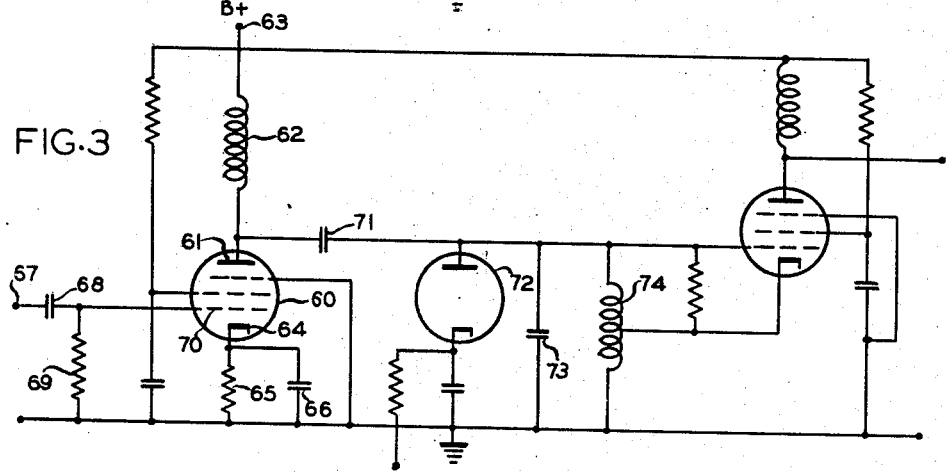
INVENTOR.
ALFRED G. EMSLIE
BY
*William D. Hall*
ATTORNEY Patented Nov. 10, 1953

2,659,009

UNITED STATES PATENT OFFICE 2,659,009

ELECTRONIC OSCILLATOR SYNCHRONIZING CIRCUIT

Alfred G. Emslie, Boston, Mass., assignor, by mesne assignments, to the United States of America as represented by the Secretary of War Application May 17, 1945, Serial No. 594,260

9 Claims. (Cl. 250—36)

The present invention relates to synchronization of oscillators, and it relates more particularly to oscillators that are synchronized by means of short-duration pulses of electrical energy.

One application of pulse-locked oscillators is in a coherent pulse-echo, radio object-location system. In a system of this general type, exploratory pulses consisting of short-duration high carrier-frequency pulses of radiant energy are transmitted, and simultaneously with said transmission, continuous-wave or interrupted continuous-wave reference oscillations are initiated at the receiver. These reference oscillations must have a fixed-phase with respect to the transmitted exploratory pulses and hence are synchronized thereto. Echo pulses returning from a reflecting object are combined with the reference oscillations and a video pulse is obtained from said combination.

If the reflecting object is stationary, the video pulses representing said object will have a constant amplitude, whereas if the reflecting object is moving, the video pulses will have varying amplitudes. For a moving-object, the amplitude variation of the video pulses is periodic, the frequency of this periodic variation providing an indication of the radial velocity of the object relative to the system. A coherent pulse-echo system of this general character is more fully described in copending application of Robert H. Dicke, Serial No. 590,052, filed April 24, 1945, and issued on December 26, 1950, as Patent No. 2,535,274.

If the returning echo pulses are to be combined directly with the reference oscillations, said oscillations may be provided by a suitable radio-frequency oscillator. In some coherent pulse-echo systems, however, the carrier-frequency of the returning echo-pulses is reduced to a suitable intermediate-frequency, and in this instance the reference oscillations are generated by an inter-mediate-frequency oscillator. In either case, it is necessary to synchronize or lock the reference oscillations with the transmitted exploratory pulses so that the reference oscillations will always have a fixed-phase with respect to said transmitted pulses.

It is therefore an object of the present invention to provide an improved pulse-injection method and system for synchronizing an oscillator readily and accurately to the exploratory pulses in such a manner that distortion is minimized.

It is another object of the present invention to provide means for damping the reference oscillations immediately prior to injection of the synchronizing pulses.

The above and other objects and advantages will appear more fully from the following description, considered with the accompanying drawings, wherein:

Fig. 1 is a schematic diagram of one embodiment of the present invention utilizing a diode;

Fig. 2 is a schematic diagram of a second embodiment of the present invention utilizing a cathode follower; and Fig. 3 is a schematic diagram of a third embodiment of the present invention.

Referring now to Fig. 1 there is shown a pentode vacuum tube 10 for the generation of continuous wave oscillation. One side of grid coupling capacitance 13 is connected to control grid 18 of vacuum tube 10, the other side of capacitance 13 being connected to junction point 19. Junction point 19 is thence connected to ground through an oscillatory circuit comprising inductance 12 and parallel connected capacitance 11. Cathode K is connected to ground through an intermediate point on inductance 12. Grid circuit resistance 14 is connected between the terminals of grid 18 and cathode K. Anode 28 is connected to a positive source of potential through inductance 15; screen grid 31 is connected to the positive source of potential through resistance 16 and to ground through screen grid capacitance 17.

Anode 20 of amplitude-control diode vacuum tube 21 is connected to both junction point 19 and, through input coupling condenser 26, to input terminal 27. Cathode 22 of vacuum tube 21 may be connected to ground through capacitance 23, and in addition may be provided with a positive bias voltage by connecting said cathode through resistance 24 to a suitable source of bias potential 25. Vacuum tube 21 then remains non-conducting until the voltage on anode 20 of said tube exceeds cathode bias potential 25.

The amount of positive bias voltage on cathode 22 of vacuum tube 21 establishes the magnitude of the oscillating voltage in the tank circuit comprising capacitance 11 and inductance 12. If the oscillator, of which said tank circuit is a component, is to provide reference oscillations for use with a coherent pulse-echo system of the character described, said cathode bias voltage can be set so that the oscillating voltage level will produce the desired signal magnitude at the mixer (not shown).

If the magnitude of the positive going portion of the tank circuit oscillations exceed the positive bias voltage on cathode 22 of vacuum tube 21, said vacuum tube becomes conducting, and its impedance becomes relatively small. Thus a low impedance is placed across the tank circuit and the oscillations therein are damped. Shortly after the magnitude of the thus damped oscillations becomes less than said cathode bias voltage, vacuum tube 21 again becomes non-conducting, and the damping impedance is removed. Vacuum tub 21, therefore, provides a means whereby the tank circuit oscillations are maintained at a substantially constant predetermined amplitude.

Two pulses may be applied to input terminal 27, a negative-going damping pulse and a synchronizing pulse, the damping pulse being applied just prior to the synchronizing pulse. In order to most easily lock the oscillator the carrier frequency of the synchronizing pulse should be substantially equal to the frequency of the oscillator. The damping pulse feeds through input coupling capacitance 26 and grid coupling capacitance 13 to decrease the voltage on control grid 18 of vacuum tube 10. The effect of this negative-going pulse is to momentarily damp the amplitude of the tank circuit oscillations to a magnitude appreciably smaller than that determined by the bias voltage on cathode 22 of amplitude-control tube 21. Upon removal of the negative-going damping pulse, and prior to application of the synchronizing pulse, the oscillations will quickly tend to rise to the normal magnitude as determined by the aforesaid bias voltage.

Shortly after the damping pulse is applied to input terminal 27 and before the tank circuit oscillations have attained their normal amplitude the synchronizing pulse is applied to input terminal 27 through input coupling capacitance 26 and grid coupling capacitance 13 to control grid 18 of vacuum tube 10. The synchronizing pulse may, in a coherent pulse echo system as heretofore described, be a portion of the transmitted pulse or a pulse synchronized thereto. If the reference oscillations have an intermediate frequency, the carrier frequency of the portion of the transmitted pulse used to synchronize the reference oscillator should be reduced to the intermediate frequency.

The striking of control grid 18 by the synchronizing pulse reinforces the oscillations of the tank circuit in such a manner that the oscillatory output from anode 28 of vacuum tube 10 is securely locked to the input synchronizing pulse. The oscillator output may be taken from anode 28 of vacuum tube 10, through output capacitance 29 to output terminal 30. The damping of the tank circuit oscillations prior to injection of the synchronizing pulse insures that said pulse is of large magnitude as compared to the oscillations and can thereby control the phase of said oscillations.

A second mode of operation is one utilizing a single pulse, wherein the synchronizing pulse may accomplish both the damping and synchronizing functions. In such an instance a synchronizing pulse, having an amplitude which exceeds the bias on cathode 22 of vacuum tube 21, is applied to input terminal 27. Vacuum tube 20 thus conducts and momentarily places a low impedance across the tank circuit comprising capacitance 11 and inductance 12. The Q of the tank circuit is thus reduced and the phase of the tank circuit oscillations can be readily controlled by the synchronizing pulse.

Referring now to Fig. 2, a cathode follower replaces the diode 21 of Fig. 1 to provide damping means. The oscillator circuit including vacuum tube 40 and associated circuit elements is the same as that shown in Fig. 1. Vacuum tube 41, however, is a cathode follower having anode 42 connected to a suitable source of positive potential 43 and cathode 44 connected to junction point 45. It will be noted that junction point 45 is similar to junction point 19 of Fig. 1.

Control grid 46 of vacuum tube 41 is connected to a source of negative bias potential 47 which biases vacuum tube 41 beyond cutoff and establishes the amplitude of the tank circuit oscillations. When the negative going portion of the oscillations drives cathode 44 of vacuum tube 41 sufficiently negative, the potential difference between control grid 46 and cathode 44 is decreased to a value such that vacuum tube 41 will conduct. Conduction of this vacuum tube provides, in essence, a low impedance across the tank circuit comprising inductance 48 and capacitance 49. The reason for this is apparent when it is realized that the impedance "looking" from the tank circuit into the cathode circuit is substantially $$\frac{1}{g_m}$$

so in effect a low impedance is connected from junction point 45 to ground. As is well known in the art, $g_m$ is defined as the mutual conductance of a vacuum tube.

The effect of this low impedance is to damp the amplitude of oscillations in the tank circuit. When the magnitude of the negative going portion of these oscillations decreases to a value whereby the potential difference between control grid 46 and cathode 44 of vacuum tube 41 makes said vacuum tube once again non-conducting, the normal amplitude of oscillations will be resumed. It will be seen therefore that the effect of cathode follower 41 is to maintain the amplitude of oscillations in the tank circuit substantially constant, and said amplitude may be controlled by bias source 47.

A positive-going damping pulse may be applied to input terminal 54 and thence through resistance 55 to control grid 46 of vacuum tube 41 to momentarily raise the potential of control grid 46 above cut-off. Vacuum tube 41 thereby conducts and a low impedance is momentarily placed across the tank circuit to effectively damp the oscillations therein. While these oscillations are thus damped, the synchronizing pulse may be applied to input terminal 50. The output of the oscillator circuit may be taken from anode 56 of vacuum tube 40 through capacitance 57 to output terminal 58.

If the continuous wave oscillations are to be used as reference oscillations in a coherent pulse-echo radio object location system, frequency stability of the oscillator is highly desirable.

Fig. 3 is a schematic diagram of a circuit which provides greater frequency stability for the damping and synchronizing circuit shown in Fig. 1.

Referring now to Fig. 3, vacuum tube 60 is a pentode, anode 61 of which may be connected through anode inductance 62 to a source of suitable positive potential 63. Cathode 64 of said vacuum tube may be connected through parallel connected cathode resistance 65 and cathode capacitance 66 to ground.

A positive-going damping pulse may be applied to input terminal 67 through coupling capacitance 68 and grid leak resistance 69 to ground. The positive-going pulse developed across grid leak resistance 69 is thence applied to control grid 70 of vacuum tube 60. Appearing at anode 61, of said vacuum tube is a negative-going damping pulse which is fed through output capacitance 71 to the oscillator circuit in the same manner as was described in connection with the embodiment shown in Fig. 1. Similarly a synchronizing pulse is fed to input terminal 67 subsequent to said damping pulse.

The pentode has the advantage that during the time diode 72 is non-conducting, there is a very high impedance across the tank circuit comprising tank circuit capacitance 73 and tank circuit inductance 74 which therefore isolates said tank circuit from all preceding circuits. This has the advantage in that it results in greater oscillator frequency-stability.

As described in connection with the embodiment of Fig. 1 a single pulse may be utilized to accomplish both the damping and synchronizing functions.

Although this method of oscillator synchronization is particularly applicable to coherent pulse-echo object location systems, the method is perfectly general and may be applied to other oscillators. Furthermore, although Hartley type oscillators are shown in the drawings, other types of oscillators may be used in this invention with equal success. It is to be further understood that the synchronizing pulse need not be applied to the control grid of the oscillator tube but may be applied to other electrodes of said tube.

Having described the invention, what is claimed as new and is desired to be secured by Letters Patent is:

1. An oscillator synchronizing circuit, including a vacuum tube oscillator having an oscillation frequency determining tank circuit connected to the electrodes of said tube, normally inoperative damping means connected across said tank circuit for lowering the output of said oscillator, when it exceeds a predetermined amplitude, and means for applying pulses to an electrode of said tube to lower the amplitude and easily synchronize the oscillation of said oscillator with said pulses.

2. An oscillator synchronizing circuit, including a vacuum tube oscillator having an oscillation frequency determining tank circuit connected to the electrodes of said tube, damping means comprising a vacuum tube connected in shunt with said tank circuit and means for applying a predetermined cut-off bias voltage to said shunt vacuum tube, whereby said shunt vacuum tube serves to damp the amplitude of oscillation of said oscillator when said bias is overcome, and means for applying pulses to an electrode of said oscillator tube to lower the amplitude and easily synchronize the oscillation of said oscillator with said pulses.

3. The circuit of claim 2, wherein said shunt vacuum tube comprises a diode.

4. The circuit of claim 3, wherein said pulses comprise a series of damping pulses each of which is immediately followed by a synchronizing pulse having a carrier frequency substantially equal to said oscillation frequency.

5. The circuit of claim 2, wherein said shunt vacuum tube comprises a triode having its cathode connected to said means for applying pulses to said oscillator tube and its anode connected to a source of positive potential.

6. The circuit of claim 5, wherein said pulses comprise a series of damping pulses each of which is immediately followed by a separate synchronizing pulse having a carrier frequency substantially equal to said oscillation frequency, said damping pulses being applied to the control electrode of said triode and the synchronizing pulses being applied directly to said means for applying pulses to said oscillator tube.

7. The circuit of claim 2, further including a pentode vacuum tube in shunt with said tank circuit and receptive of said pulses, for coupling said pulses to said means for applying pulses to said oscillator tube and for isolating said tank circuit when the first-named shunt vacuum tube is cut-off.

8. The circuit of claim 7, wherein the first-named shunt vacuum tube comprises a diode.

9. The circuit of claim 8, wherein said pulses comprise a series of damping pulses each of which is immediately followed in time by a separate synchronizing pulse having a carrier frequency substantially equal to said oscillation frequency.

ALFRED G. EMSLIE.

References Cited in the file of this patent

UNITED STATES PATENTS

| Number | Name | Date |
|---|---|---|
| 1,769,270 | Ohl | July 1, 1930 |
| 2,243,524 | Deal | May 27, 1941 |
| 2,412,710 | Bradley | Dec. 17, 1946 |
| 2,440,073 | Bradley | Apr. 20, 1948 |
| 2,443,619 | Hopper | June 22, 1948 |
| 2,456,016 | Owen | Dec. 14, 1948 |
| 2,495,115 | Mayer | Jan. 17, 1950 |

FOREIGN PATENTS

| Number | Country | Date |
|---|---|---|
| 274,660 | Great Britain | July 28, 1927 |
| 460,693 | Great Britain | Feb. 2, 1937 |